Sept. 23, 1952 G. W. JOHNSON 2,611,215
LEAF STRIPPER
Filed Dec. 14, 1946 3 Sheets-Sheet 1

INVENTOR,
Gordon W. Johnson.
BY
Roy E. Hamilton,
Attorney.

Sept. 23, 1952  G. W. JOHNSON  2,611,215
LEAF STRIPPER
Filed Dec. 14, 1946  3 Sheets-Sheet 2
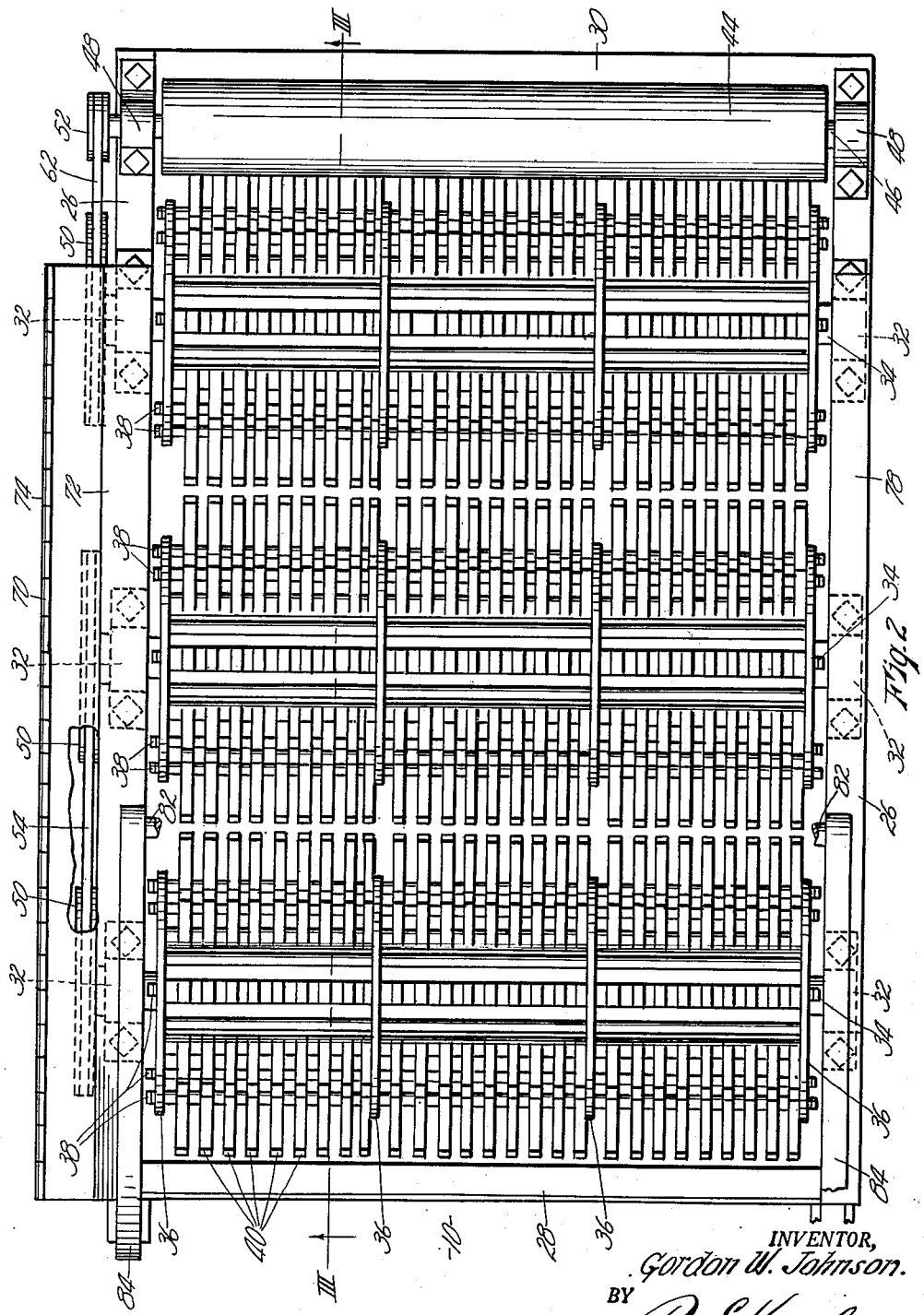
INVENTOR,
Gordon W. Johnson.
BY
Roy E. Hamilton,
Attorney.

Sept. 23, 1952 G. W. JOHNSON 2,611,215
LEAF STRIPPER
Filed Dec. 14, 1946 3 Sheets-Sheet 3
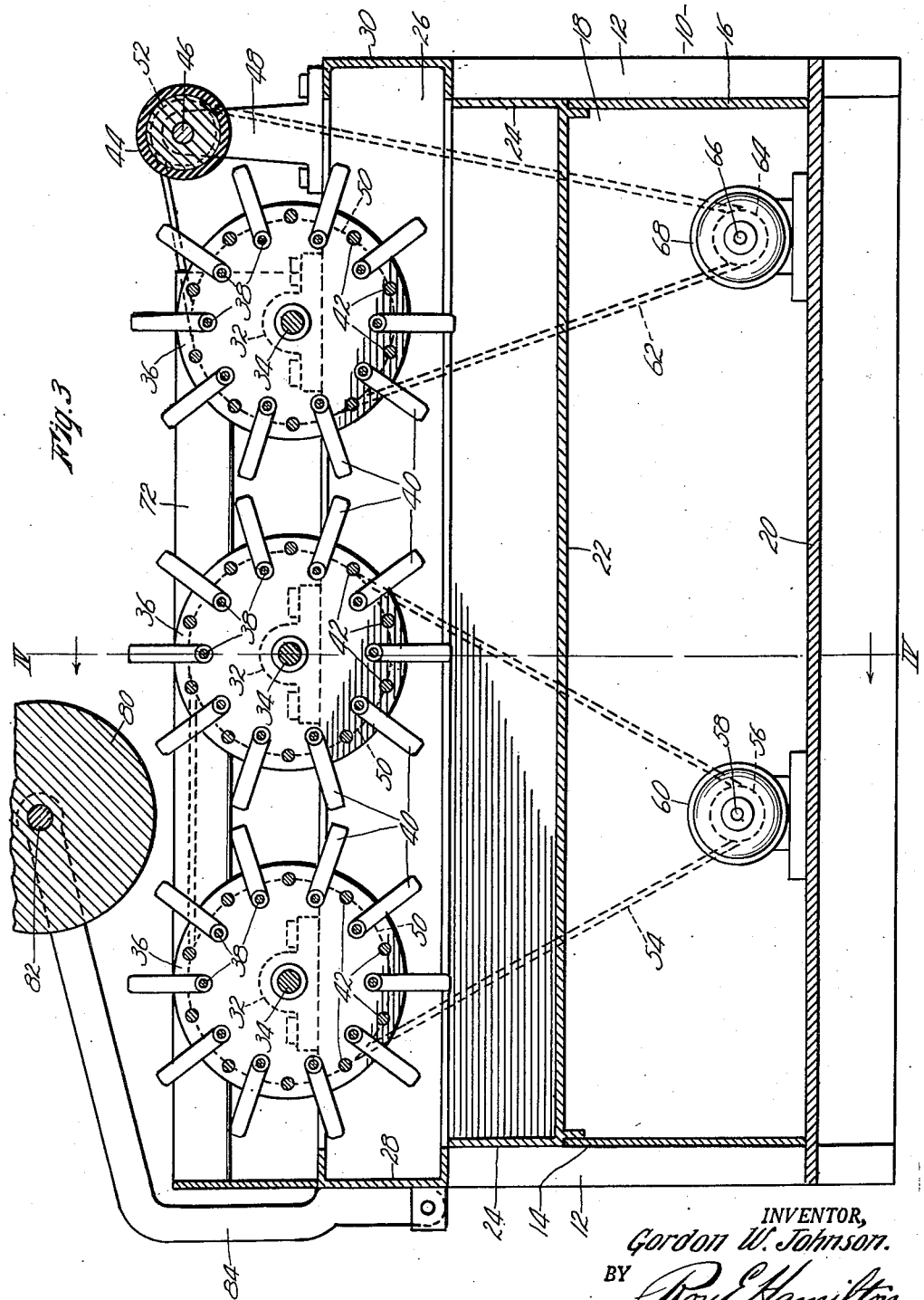
INVENTOR,
Gordon W. Johnson.
BY Roy E. Hamilton,
Attorney.

Patented Sept. 23, 1952

2,611,215

UNITED STATES PATENT OFFICE 2,611,215

LEAF STRIPPER

Gordon W. Johnson, Raytown, Mo., assignor to Gordon Johnson Company, Kansas City, Mo., a corporation of Missouri Application December 14, 1946, Serial No. 716,359

4 Claims. (Cl. 47—1)

This invention relates to new and useful improvements in leaf strippers for small trees, shrubs, and the like, and has particular reference to leaf strippers wherein the leaves are striped from the branches by means of fingers carried on the peripheries of rotating drums.

When nursery trees and shrubs are tied in bundles for shipping or winter storage, it is necessary to remove the leaves. Otherwise the leaves will mould, heat will be generated, and damage to the plants will result.

The principal object of the present invention is, therefore, the provision of a leaf stripper whereby leaves are stripped from a tree or shrub by a plurality of resilient fingers pivotally mounted on the peripheries of a plurality of rotating drums.

Another object is the provision of a means whereby said tree or shrub is yieldably urged against said rotating drums.

Other objects are simplicity and economy of construction, and ease and efficiency of operation.

With these objects in view, as well as other objects which will become apparent during the course of the specification, reference will be had to the drawings, wherein:

Fig. 2 is an enlarged plan view of the leaf stripper partially broken away.

Fig. 3 is a vertical section taken on line III—III of Figure 2, partially broken away.

Figure 4:
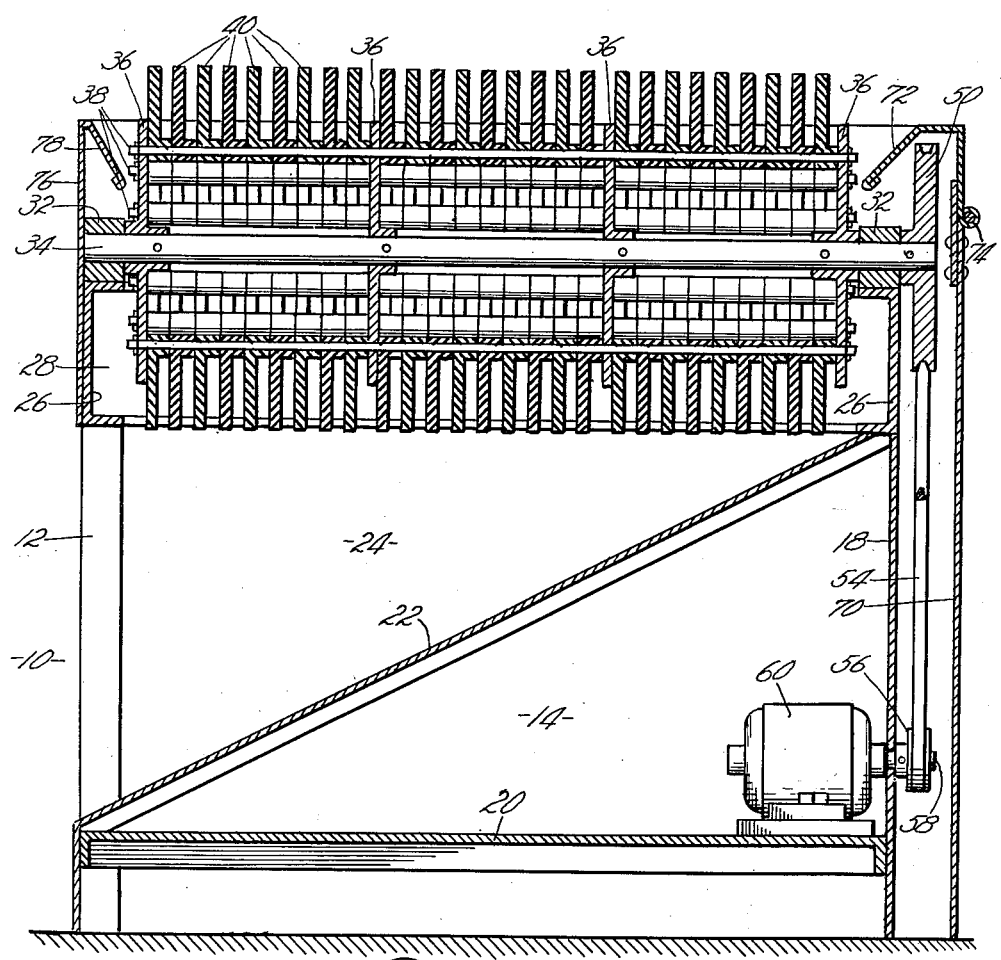
Fig. 4 is a vertical section taken on line IV—IV of Figure 3.

Like reference numerals apply to similar parts throughout the several views, and the numeral 10 applies to a rectangular base having floor engaging angle iron corner members 12, a front panel 14, a rear panel 16, and a left side panel 18, said front, rear, and left side panels being rigidly attached to said corner members. A motor support 20 extends horizontally across said base at a point adjacent the floor, and is rigidly attached to said corner members. A leaf tray 22 carried by said base and extending the length thereof is rigidly fixed at its left edge to left side panel 18 at the upper edge thereof, and slopes downwardly to the right therefrom, the right edge of said tray being securely fixed to the edge of motor support 20, as shown in Figure 4. The front and rear edges of said tray are bent upwardly to form leaf retaining walls 24 extending to the upper edge of base 10, as shown in Figure 3.

Supported by said base and rigidly fixed thereto is an open rectangular frame constructed of channel iron and comprising side members 26, front member 28, and rear member 30.

Extending between side frame members 26 and carried for rotation in bearings 32 rigidly mounted on said frame members, are three parallel shafts 34. A plurality of discs 36 are equally spaced on and rigidly fixed to each of said shafts, the outermost discs abutting against bearings 32 and preventing longitudinal movement of said shafts in said bearings. A plurality of rods 38, equally spaced about the peripheries of discs 36, extend through said discs parallel to said shafts, and on each of said rods are pivotally mounted a plurality of outwardly extending resilient fingers 40. A plurality of rods 42 also extend through and are fixed in discs 36, each of said rods being parallel to rods 38 and being spaced midway between the two adjacent rods 38 and closer to the edge of said discs than rods 38, as shown in Figure 3. When shafts 32 are rotated, fingers 40 stand radially out from said shafts as in Figure 3, due to centrifugal force. When said shafts are at rest, said fingers will be against the adjacent rod 42.

A smooth drum 44 is mounted on a shaft 46 carried for rotation in bearings 48 rigidly attached to side frame members 26. The top of said drum is substantially in the same horizontal plane as the uppermost point of travel of fingers 40.

A pulley 50 is rigidly fixed to the extended left end of each shaft 34, and a pulley 52 is rigidly fixed to the extended left end of shaft 46. Pulleys 50 attached to the two forward shafts 34 are operably connected by means of belt 54 to pulley 56 fixed to shaft 58 of motor 60, as shown in Figure 3. Said motor is mounted on motor support 20, and its shaft extends through left side panel 18. Pulley 50 attached to the rearmost of shafts 34, and pulley 52 attached to drum shaft 46, are operably connected by means of belt 62 to pulley 64 rigidly fixed to shaft 66 of motor 68. Said motor is mounted on motor support 20 and its shaft extends through left side panel 18. All of shafts 34, and shaft 46, are thereby caused to rotate in a clockwise direction as viewed in Figure 3.

A cover 70 removably attached to left side panel 18, protects said pulleys and said belts, said cover being provided at its upper edge with an inwardly projecting bevelled flange 72 which covers bearings 32 and prevents twigs of trees held in contact with fingers 40 from becoming fouled in said bearings. Said flange and the upper portion of cover 70 are adapted to be hingeably swung outwardly on hinge 74 to provide ready access to said belts and pulleys. A sheet metal member 76 attached to left frame member 26 and extending upwardly therefrom, has an inwardly projecting bevelled flange 78 and prevents fouling of twigs in bearings 32 carried by said frame member.

A press drum 80 is carried above and parallel to shafts 34, being spaced relatively between and above the two forward shafts 34, as shown in Figure 3. Said drum is carried for rotation by shaft 82, the ends of said shaft being respectively carried by two arms 84, said arms extending forwardly and downwardly therefrom and being pivotally attached at their lower ends to front frame member 28 at opposite sides thereof. Said pivoted arms bear against said front frame member for a portion of their length whenever press drum 80 is at rest, thus preventing said drum from entering the orbits of fingers 40, as shown in Figure 3.

Figure 1:
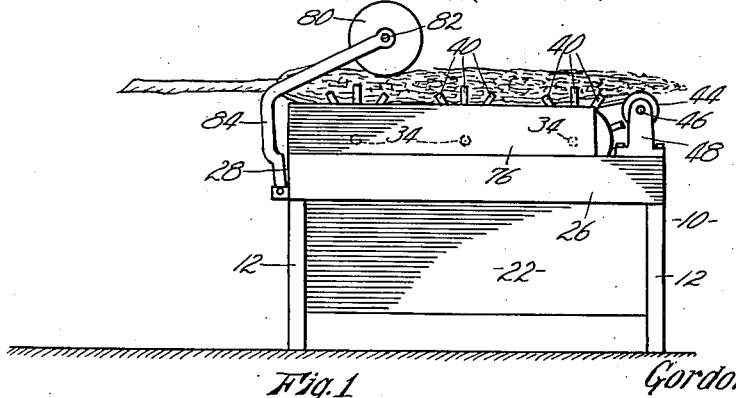
Figure 1 is a side elevation of a leaf stripper embodying the present invention showing a tree positioned in operative relationship thereto.

The operation of the leaf stripper is substantially as follows. Shafts 34 and 44 are set in rotation as described, and a tree or shrub is laid on fingers 40 of the forward shaft 34. The rearward motion of said fingers will draw said tree or shrub between said fingers and drum 80 to the position shown in Figure 1, and said drum, being urged downwardly by gravity, will press said tree against said fingers, said fingers stripping the leaves therefrom. Fingers 40 are of a resilient material sufficiently soft to prevent injury to the bark of the tree. The leaves thus removed from the tree then fall to inclined leaf tray 22 and thence pass out of the open right side of base 10. Long flexible twigs of the tree are prevented from wrapping about shafts 34 or pivot rods 38 by means of rods 42. Longer branches of the tree are prevented from being drawn downwardly by the fingers carried by each shaft 34 by the fingers carried on the next shaft to the rear, said last named fingers moving upwardly adjacent said first named fingers. Branches are prevented from being drawn downwardly by the fingers on the rearmost shaft 34 by smooth drum 44, as shown in Figure 1. Said drum, having a smooth surface, has no tendency to grip said branches.

The improvements I claim as new and desire to protect by Letters Patent are:

1. A leaf stripper comprising a frame, a plurality of drums rotatably carried by said frame, means for rotating said drums, a plurality of pivot rods carried in spaced relationship about the peripheries of said drums parallel to the axes of said drums, a plurality of resilient fingers pivotally carried on each of said rods and adapted to be extended radially from said drums by centrifugal force, and a rod carried by said drums parallel to and between each pair of said pivot rods, said rods being spaced radially outwardly from said pivot rods and limiting the pivot arc of said fingers.

2. A leaf stripper comprising a frame, a plurality of parallel drums rotatably carried by said frame, means for rotating said drums, a plurality of resilient fingers mounted on the periphery of each of said drums, and a smooth cylindrical drum parallel to said finger drums rotatably carried by said frame for pivotal movement toward and away from said finger drums, said smooth drum being operable by gravity to urge a leafed plant against said finger drums.

3. A leaf stripper comprising a frame, a plurality of spaced apart parallel drums carried for rotation by said frame, means for rotating each of said drums in the same direction, a plurality of resilient fingers pivotally mounted on the periphery of each of said drums whereby leaves are stripped from a tree held in contact with said drums, a smooth cylindrical drum rotatably carried by said frame adjacent and parallel to the rearmost of said finger drums, whereby branches of said tree are prevented from wrapping about said finger drum, and means for rotating said smooth drum in the same direction as said finger drums.

4. A leaf stripper comprising a frame, a plurality of spaced apart parallel drums rotatably carried by said frame, a plurality of outwardly extending resilient fingers pivotally mounted on the periphery of each of said drums, a smooth cylindrical drum rotatably carried by said frame adjacent and parallel to said finger drums, means for rotating said finger drums and said smooth drum in the same direction, and a smooth cylindrical drum rotatably carried by said frame for pivotal movement toward and away from said finger drums, said last named smooth drum being operable by gravity to urge a tree against said finger drums.

GORDON W. JOHNSON.

REFERENCES CITED

The following references are of record in the file of this patent:

UNITED STATES PATENTS

| Number | Name | Date |
|---|---|---|
| 64,836 | Campbell | May 21, 1867 |
| 476,234 | Myers | May 31, 1892 |
| 524,333 | Mills | Aug. 14, 1894 |
| 720,802 | Havens | Feb. 17, 1903 |
| 887,519 | Reed | May 12, 1908 |
| 1,301,193 | Strickland | Apr. 22, 1919 |
| 1,372,595 | Bouda | Mar. 22, 1921 |
| 1,424,989 | Covey | Aug. 8, 1922 |
| 2,012,250 | Rundell | Aug. 20, 1935 |
| 2,226,206 | McConnell | Dec. 24, 1940 |
| 2,354,112 | Garst | July 18, 1944 |
| 2,376,120 | Campbell | May 15, 1945 |

FOREIGN PATENTS

| Number | Country | Date |
|---|---|---|
| 2,927 | Australia | 1911 |
| 172,914 | Canada | Oct. 31, 1916 |
| 406,607 | France | Dec. 11, 1909 |